July 28, 1936.  W. BAUMGÄRTNER  2,048,773
DEVICE FOR PARALLAX ADJUSTMENTS IN PHOTOGRAPHIC CAMERAS
Filed Oct. 29, 1934
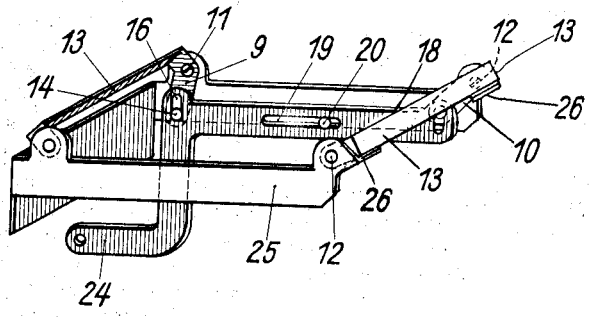
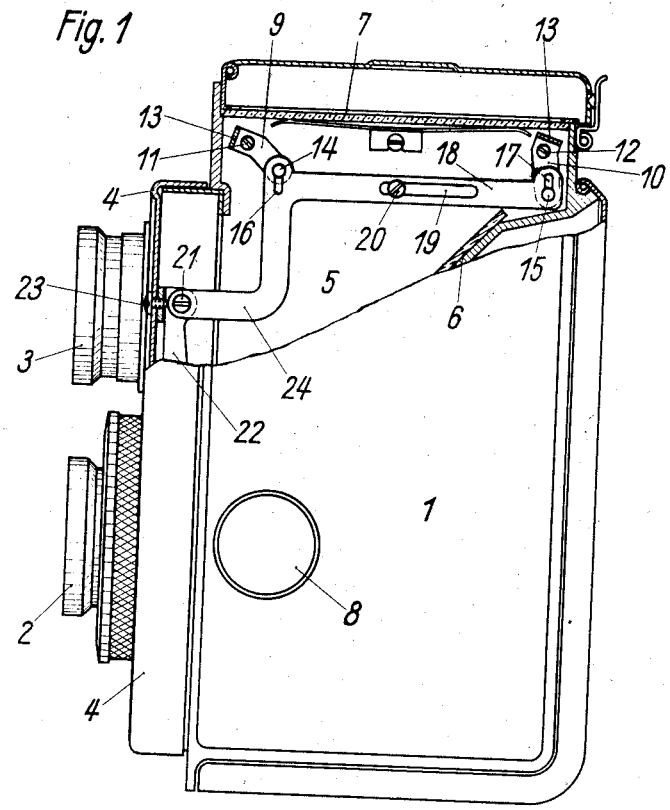
INVENTOR
WILHELM BAUMGÄRTNER
By Emil Bönnelycke
ATTORNEY Patented July 28, 1936

2,048,773

UNITED STATES PATENT OFFICE 2,048,773

DEVICE FOR PARALLAX ADJUSTMENT IN PHOTOGRAPHIC CAMERAS

Wilhelm Baumgärtner, Brunswick, Germany, assignor to Paul Franke and Reinhold Heidecke, both of Brunswick, Germany Application October 29, 1934, Serial No. 750,488
In Germany October 31, 1933

7 Claims. (Cl. 95—44)

The invention relates to photographic cameras of the kind in which a view finder objective is used in addition to the objective through which the exposure takes place, the view finder objective producing an image on a screen or its equivalent. In connection with such cameras various devices have been used for what is called parallax adjustment, the object of which is to ensure that with every adjustment of focus that is made the screen will show everything that will appear in the photograph when it is taken.

The object of my invention is to provide an improved device for this purpose. According to the invention I arrange in the vicinity of the image carrier (which I shall hereinafter generally refer to as the screen) two members which may be called gage bars, adapted to be moved relatively to each other transversely of the path of the rays projected on to the screen and arranged so that they delimit the effective image field, enabling the size of that field to be increased or reduced, according to the focal adjustment of the camera. The adjustment of the gage bars may with advantage be effected in conjunction with the focal adjustment, so that a single operation adjusts the lenses and the members which delimit the image field of the view finder.

The invention is illustrated in the accompanying drawing, in which

Fig. 1 is a side view of a camera, partly in section, showing one embodiment of the invention, and Fig. 2 is a perspective view of another embodiment.

Referring first to Fig. 1, the camera 1 has a main objective 2 and a view finder objective 3, both the objectives being carried by a holder 4, which is adjustable by means of mechanism not illustrated, actuated by turning a button 8. The objective 3 projects the incident light rays on to a mirror 6 disposed at an angle of 45° to the horizontal in chamber 5, and the mirror projects the rays on to a horizontal screen 7 at the top. In the embodiment shown the screen is a ground glass plate, but other optical elements may be used for the same purpose. Below the screen symmetrical arms 9, 10 are pivoted at 11 and 12 respectively, and to these arms are fixed bars 13 extending across the camera through the full width of the image thrown on to the screen. The arms can be moved so that the edges of the bars define the limits of the image. Studs 14, 15 fixed to the arms 9, 10 engage vertical slots 16, 17 in a bracket 18, which has a horizontal slot 19 engaged with a stud 20. An arm 24 fixed to the bracket is connected by a screw 21 to a member 22 fixed by a screw 23 to the objective holder 4. The connection made by the screw 21 allows of rotation of the arm 24 relatively to the holder 4. A rigid connection might be inconvenient in cases of slight inaccuracy of manufacture.

By movement of the holder 4 for focussing purposes the bracket 18 is moved horizontally and caused to rock the arms 9, 10. By this means the gage bars 13 are moved in relation to the screen 7 so as to change the limits of the field from front to rear of the screen.

In the modification shown in Fig. 2 the device for parallax adjustment is carried by a frame 25 consisting of two side members and a member extending across the front part of the camera. The lateral members have lugs 26 for attaching the frame to the camera, e. g. by means of screws. The frame 25, carrying the arms 9, 10 and the bracket 18, can easily be inserted into the camera, connection of the arm 24 to the objective holder being made by any convenient means. Similarly, removal can be effected when the connection has been unmade again.

What I claim as my invention and desire to secure by Letters Patent of the United States is:—

1. In a photographic camera the combination of a main objective, a view finder objective, an image carrier on to which rays are projected by said view finder objective, pivoted arms in the vicinity of said image carrier, and gage bars carried by said arms, adapted to be moved by said arms transversely of the path of said rays and to delimit the effective image field.

2. In a photographic camera the combination of a main objective, a view finder objective, an image carrier on to which rays are projected by said view finder objective, pivoted arms in the vicinity of said image carrier, gage bars carried by said arms, adapted to be moved by said arms transversely of the path of said rays and to delimit the effective image field, focussing mechanism for adjusting said objectives and means actuated by said focussing mechanism for rocking said arms.

3. In a photographic camera the combination of a main objective, a view finder objective, an image carrier on to which rays are projected by said view finder objective, pivoted arms in the vicinity of said image carrier, gage bars carried by said arms, adapted to be moved by said arms transversely of the path of said rays and to delimit the effective image field, studs on said arms, a movable bracket having slots engaged with said studs, means for rectilinear guidance of said bracket transversely of the direction of said slots, focussing mechanism for said objectives, and means connecting said bracket to said focussing mechanism whereby adjustment of said objectives by said focussing mechanism causes said bracket to rock said arms.

4. In a photographic camera the combination of a main objective, a view finder objective, an image carrier on to which rays are projected by said view finder objective, pivoted arms in the vicinity of said image carrier, gage bars carried by said arms, adapted to be moved by said arms transversely of the path of said rays and to delimit the effective image field, studs on said arms, a movable bracket having curved slots engaged with said studs, means for rectilinear guidance of said bracket transversely of the direction of said slots, focussing mechanism for said objectives, and means connecting said bracket to said focussing mechanism whereby adjustment of said objectives by said focussing mechanism causes said bracket to rock said arms.

5. A device for parallax adjustment in a camera having a view finder objective and an image carrier on to which rays are projected by said objective, comprising in combination gage bars, carriers for said gage bars, means for moving said gage bar carriers whereby said gage bars are adjusted in relation to each other, and a holder for said gage bar carriers and said means for moving the same adapted to be inserted into said camera so that said gage bars can be moved into the path of the rays projected on to said image carrier for the purpose set forth.

6. In a photographic camera the combination of a main objective, a view finder objective, an image carrier on to which rays are projected by said view finder objective, gage bars extending transversely of said image carrier, and pivoted carriers for said gage bars whereby said bars can be rocked in relation to each other so as to delimit the effective image field.

7. In a photographic camera the combination of a main objective, a view finder objective, a holder for said objectives, which is movable for focussing the same, an image carrier on to which rays are projected by said view finder objective, gage bars extending transversely of said image carrier, pivoted carriers for said gage bars, and means connecting said pivoted carriers to said holder of said objectives so that by movement of said holder said gage bars are rocked in relation to each other so as to delimit the effective image field.

WILHELM BAUMGÄRTNER.